Oct. 5, 1971        W. M. BARTLETT        3,609,897
VIEWER FOR TELEVISION PROGRAM LISTINGS AND THE LIKE
Filed May 28, 1969

INVENTOR.
WILLIAM M. BARTLETT
BY Merchant & Gould
ATTORNEYS

United States Patent Office 3,609,897
Patented Oct. 5, 1971

3,609,897
VIEWER FOR TELEVISION PROGRAM LISTINGS AND THE LIKE
William M. Bartlett, Minneapolis, Minn., assignor to Willis C. Butterfield and Edward M. Carlin, both of Minneapolis, Minn., fractional part interest to each
Filed May 28, 1969, Ser. No. 828,660
Int. Cl. G09f *11/24*
U.S. Cl. 40—82                                     3 Claims

ABSTRACT OF THE DISCLOSURE

A viewer is disclosed that is constructed to store and display a roll-strip of television program listings and the like. The viewer is formed from spaced sheets of transparent plastic material connected along one edge and terminating in a cylindrical magazine that receives and enables the roll-strip to be forwarded to the space between the sheets.

---

The invention relates to viewers that house and display information such as television program listings on a roll-strip of material.

Frequently, television listings are printed for an entire week to enable the selection of television programs without reference to a daily newspaper or other periodical. The newspaper page upon which the week's listings is printed ordinarily proves cumbersome to the user over a period of a week, and I have therefore devised a viewer particularly suited to store and display daily listings taped or otherwise connected end to end. The connected listings are formed into a roll-strip which is inserted into a cylindrical magazine and daily advanced to display the appropriate listing.

DESCRIPTION OF THE PREFERRED EMBODIMENT

Figure 1:
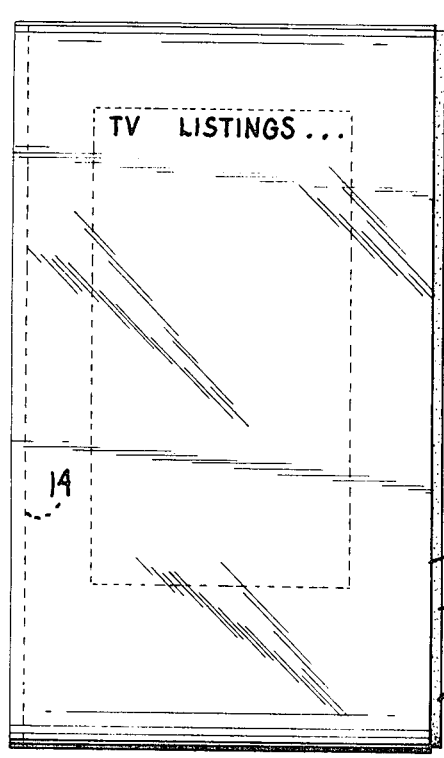
FIG. 1 is a front view of a viewing device embodying the inventive concept.
Figure 2:
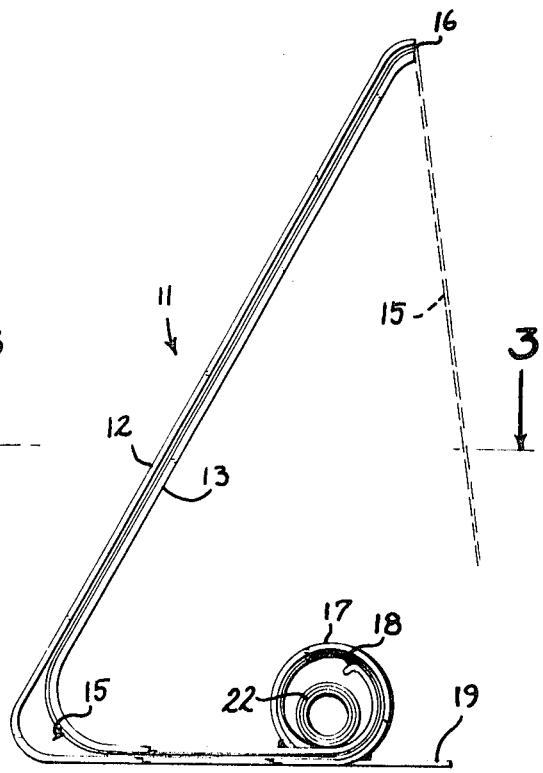
FIG. 2 is a side view of the viewing device.

In FIG. 1, a viewing device is represented generally by the numeral 11. FIG. 2 discloses device 11 as being made from a first side 12, which is at least partially transparent, and a side 13. Preferably, both are made from a transparent plastic. Sides 12 and 13 are continuously joined along one edge by a connector 14, as best shown in FIG. 3, to provide a space large enough to accept a strip of information-bearing material 15.

Sides 12 and 13 are shaped to form a lower leg upon which the device rests and an upper leg angularly disposed with respect to the lower leg which projects upwardly to allow information on the strip to be viewed through side 12. The upper leg terminates in an opening 16 that enables passage of strip 15 from the device 11. The lower leg terminates in a cylindrical magazine 17 preferably formed from extensions of sides 12 and 13. As FIG. 2 discloses, side 12 extends in a circular fashion to form magazine 17, and side 13 follows a portion of the inner cylindrical wall to extend the space between sides 12 and 13 and create a slot 18 to establish communication between the space and the inside of magazine 17. An extension 19 is included to give device 11 greater stability.

Figure 3:
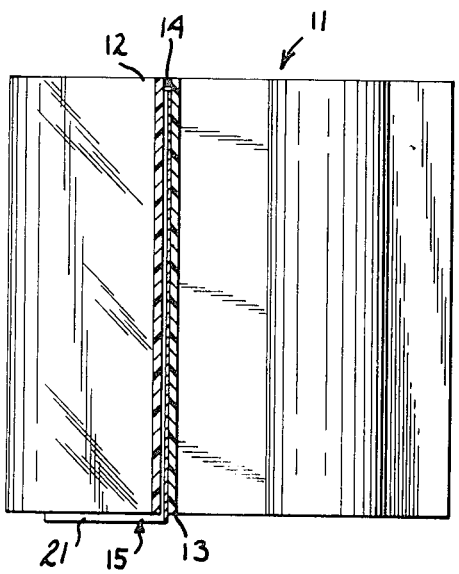
FIG. 3 is a top sectional view taken along line 3—3 of FIG. 2.

As shown in FIGS. 1 and 3, the width of device 11 is chosen to be slightly less than the strip 15 that is displayed. This leaves an exposed edge 21 which can be grasped to advance strip 15 through device 11.

In operation, the information-bearing strip of material 15 is formed into a roll 22 which is inserted into magazine 17. The leading edge of roll 22 is threaded through slot 18 and advanced by means of edge 21 through the space between sides 12 and 13 until the desired information is displayed through side 12, as shown in FIG. 1. In the case of end-connected daily television program listings, the strip 15 is advanced daily to display the appropriate listing.

The embodiments of the invention in which an exclusive right or privilege is claimed are defined as follows:

1. A device for displaying information on a strip of material formed into a roll, comprising:
   (a) first and second sides of a predetermined length and width arranged face to face and suitably connected to form a space therebetween for receiving the strip, the first side being transparent;
   (b) the first and second sides together shaped to form first and second legs disposed in angular relation to each other, the first leg constructed and arranged to support the device and the second leg projecting upwardly with the second leg portion of said first side in viewable position;
   (c) the first leg terminating in a cylindrical magazine adapted to receive the roll, the magazine being formed by the first side;
   (d) the second side extending into the magazine in conforming relation to the first side and terminating therein to define a longitudinal slot establishing communication between said magazine and said space;
   (e) and the second leg terminating in a longitudinal opening to allow passage of the strip from the device.

2. The device as defined by claim 1 wherein the first and second sides are connected at one edge.

3. The device as defined by claim 1, wherein the width of the first and second sides is less than the width of the strip to enable progression of the strip through the device by grasping the exposed edge of the strip.

References Cited

UNITED STATES PATENTS

| 573,524 | 12/1896 | McMaster | 281—6 |
| 2,070,486 | 2/1937 | Leyen | 40—82 |

FOREIGN PATENTS

| 199,256 | 6/1923 | Great Britain. | |

ROBERT W. MICHELL, Primary Examiner
L. R. OREMLAND, Assistant Examiner

U.S. Cl. X.R.
40—116; 281—6